(12) United States Patent
Kunzer et al.

(10) Patent No.: US 9,249,970 B1
(45) Date of Patent: Feb. 2, 2016

(54) ILLUMINATED MICROPHONE STAND

(75) Inventors: Daniel P. Kunzer, Lakemoor, IL (US);
Ral L. Donner, Wonder Lake, IL (US)

(73) Assignee: RRK Starlight Enterprises, LLC, Lake In The Hills, IL (US)

( * ) Notice: Subject to any disclaimer, the term of this patent is extended or adjusted under 35 U.S.C. 154(b) by 962 days.

(21) Appl. No.: 13/506,379

(22) Filed: Apr. 16, 2012

(51) Int. Cl.
*H04M 1/22* (2006.01)
*F21V 33/00* (2006.01)

(52) U.S. Cl.
CPC ......... *F21V 33/0052* (2013.01); *F21V 33/0056* (2013.01)

(58) Field of Classification Search
CPC ........................ F21V 35/0056; F21V 35/0052
USPC .......................................................... 362/86
See application file for complete search history.

(56) References Cited

U.S. PATENT DOCUMENTS

| | | | |
|---|---|---|---|
| 4,369,429 A | 1/1983 | Souder | |
| 4,542,858 A | 9/1985 | Manges | |
| 4,691,087 A | 9/1987 | Lee | |
| 4,773,621 A * | 9/1988 | Gebhardt | 248/122.1 |
| 5,126,928 A | 6/1992 | Hughes | |
| 5,760,323 A | 6/1998 | Romero et al. | |
| 5,999,801 A | 12/1999 | Johnson | |
| 6,000,948 A | 12/1999 | Peterson | |
| 6,217,364 B1 | 4/2001 | Miskin et al. | |
| 6,663,260 B1 * | 12/2003 | Tieszen | 362/249.06 |
| 6,720,490 B1 | 4/2004 | Bruce | |
| 7,007,901 B2 | 3/2006 | Kondo | |
| 7,176,366 B1 * | 2/2007 | Bruce | 84/327 |
| 7,635,109 B1 * | 12/2009 | Roberts et al. | 248/125.1 |
| 7,818,037 B2 | 10/2010 | Lair et al. | |
| 7,824,052 B1 * | 11/2010 | Halm | 362/105 |
| 2005/0185398 A1 * | 8/2005 | Scannell, Jr. | 362/227 |
| 2005/0270782 A1 * | 12/2005 | Selover | 362/362 |
| 2006/0198539 A1 | 9/2006 | Kung | |
| 2011/0116249 A1 * | 5/2011 | Jefferson, III | 362/18 |
| 2011/0135118 A1 * | 6/2011 | Osborne | 381/122 |
| 2012/0008801 A1 | 1/2012 | Morrison et al. | |
| 2014/0077723 A1 * | 3/2014 | Ahern | 315/299 |

FOREIGN PATENT DOCUMENTS

| | | | |
|---|---|---|---|
| GB | 2416300 A | * | 1/2006 |
| GB | 2462625 A | * | 2/2010 |

\* cited by examiner

*Primary Examiner* — Jong-Suk (James) Lee
*Assistant Examiner* — Bryon T Gyllstrom
(74) *Attorney, Agent, or Firm* — Mathew R. P. Perrone, Jr.

(57) ABSTRACT

The combination of an illuminated microphone stand with a foot controlled operation board has a capability of adjusting at least one light in the illuminated microphone and facilitating a performance, as well as maintaining the integrity of the lighting system Incorporated with the illuminated microphone stand.

17 Claims, 6 Drawing Sheets

ILLUMINATED MICROPHONE STAND

This invention relates to an illuminated microphone stand, more particularly, to an illuminated microphone stand which is controlled by a foot controlled board and offers flexibility in use.

BACKGROUND OF THE INVENTION

In the performing arts, there are various levels of musical performers and a variety of acts ranging from novice to touring or recording professionals. These acts often require special well-coordinated lighting effects to enhance their performance.

At the professional level, these segments are usually well rehearsed in advance and often controlled by a lighting technician that works side by side with the sound man in the back of the venue, or even off stage out of sight. These rehearsals are very expensive as the acts are paying their technicians and for rehearsal space. Furthermore, these segments usually address the bigger aspects of the lighting show and these lighting routines do not offer the performers an opportunity to be spontaneous with using the lights as a part of their expression.

Using smaller lighting effects to enhance the larger aspects of the show can be very difficult to coordinate. Therefore, it may be desirable to have the necessary equipment to provide a unique effect to achieve the desired presentation.

To that end, it is useful for the musician or performer (regardless of career level) to have "real time" control and access to a special effect lighting system, which will not interfere with the musical performance but will allow flexibility and security for the act. If that lighting system can additionally illuminate the desired musical score, and add a dynamic visual level while providing a secure, yet flexible stand for the microphone; this will be a great performance tool and provide a clear advantage for the performer.

Positioning of the light or microphone system is also critical. The light system must be conveniently located, yet not obtrusive. The light system may be required to illuminate the desired music, while at the same time being available for decorative entertainment.

Microphone stands are often considered necessary evils on stage as they are not attractive but cumbersome in fitting around music stands, props, drum sets (kits), other instruments and stage devices. Their main function has always been to simple hold the microphones in the desired location for vocal and capture sound coming from non-amplified instruments. To have a device that can achieve the above, yet be visually attractive will be a great advantage to the performer.

Microphone stands must have the ability to be adjusted to accommodate and hold a specific placement location. They also must have the flexibility to be redirected and to permit removal of the microphone itself for each user and or instrument as desired.

In some situations, this may be hard to achieve. Therefore a microphone (boom) arm is generally mounted on top of the main support post. Also, the microphone stand may have to fit under, or in between other types of stands, risers and staging. To accomplish this setup a tripod or round base may be used to support the main post, microphone, and possible a boom arm. Any adjustments made before or during a performance must not interfere with the main lighting system or the use of the microphone itself.

Such a device must support the microphone; the vertical post; possible boom arm, and yet be adjustable when needed. It must be adaptable to the situation and allow the artist the ability to remove the microphone from the stand easily during a performance.

Adding the benefits of a visual effect lighting system on to the microphone stand allows for greater visual, stage expression as part of the entertainment experience and may also serve as a tool for a performer to read music, scripts and the like. It also can be controlled by the performer to provide the desired effect to help create a mood. The light system offers a great number of light variations, and control thereof involving color, duration, sequencing, or other desired functions. Using such effects will be another tool for an entertainment production. However, this combination is difficult to achieve.

SUMMARY OF THE INVENTION

Among the many objectives of this invention is the provision of an illuminated microphone stand with a foot controlled board.

A further objective of this invention is the provision of an illuminated microphone stand, which provides adjustability and versatility.

Yet a further objective of this invention is the provision of an illuminated microphone stand, which forms part of a light show.

A still further objective of this invention is the provision of an illuminated microphone stand, which provides different light options for the performance.

Another objective of this invention is the provision of an illuminated microphone stand, which is strong.

Yet another objective of this invention is the provision of an illuminated microphone stand, which is durable.

Still another objective of this invention is the provision of a foot operated control panel which allows the user to control the lights for illuminated microphone stand.

Also, an objective of this invention is the provision of a foot control board to vary the function of the lights for illuminated microphone stand.

These and other objectives of the invention (which other objectives become clear by consideration of the specification, claims and drawings as a whole) are met by providing an illuminated microphone stand with a foot board control mechanism or foot controlled board, which has the capability of adjusting at least one light in the illuminated microphone stand during performances, as well as maintaining the integrity of the lighting system Incorporated with the illuminated microphone stand.

BRIEF DESCRIPTION OF THE DRAWINGS

Throughout the figures of the drawings, where the same part appears in more than one figure of the drawings, the same number is applied thereto.

DESCRIPTION OF THE PREFERRED EMBODIMENTS

Figures 1, 2:
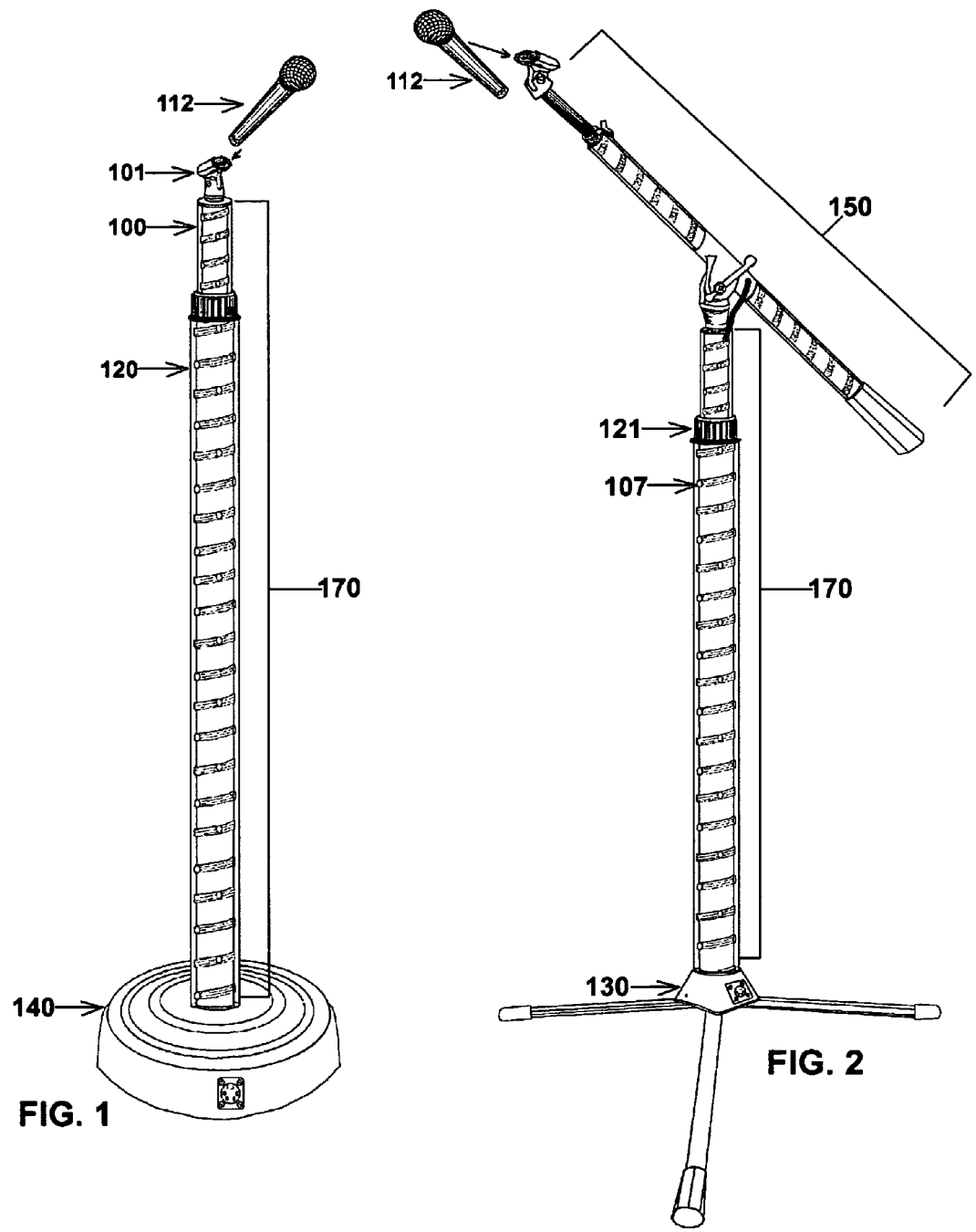
FIG. 1 depicts a perspective view of the microphone stand 170 with weighted support base 104.
FIG. 2 depicts a perspective view of the microphone stand 170 of this invention with a tripod base 102.

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar to directional terms are not to be construed to limit the scope of the invention in any manner. The words attach, connect, couple, and similar terms with their inflectional morphemes do not necessarily denote direct or intermediate connections, but may also include connections through mediate elements or devices.

In accordance with the present invention, a microphone stand is designed to be fully functional, allowing the user to adjust the stand to a desired position, just as with any conventional microphone stand. Preferably, it has a height adjustment from about 0.9 meter (about 36 inches) to about two meters (about 80 inches) and points there between. This microphone stand can be illuminated for either one of decoration, functionality or entertainment, as well as other uses. Typical lights are light emitting diodes (LED).

The key to the incorporation of LED technology and the practicality of a conventional fully operational microphone stand is in the design supporting the lighting system. Key components such as the support base with the upper shaft and the guide pin allow the stand height to be adjusted while at the same time protecting the delicate LED components and the wiring from twisting, binding, and tearing.

The coiled wire used in the upper shaft and the boom arm is also critical to the success in this design. It allows the wires to supply the upper components by acting like an extension spring. As the upper shaft is raised, the coiled wire extends. As the upper shaft is lowered, the coiled wire contracts or relaxes into its normal position, similar to a phone cord.

The upper shaft is held into its adjusted or desired place by the use of a rubber compression seal. As the adjuster is loosened, less compression is placed on the seal allowing the upper shaft to move freely. When tightened, the compression seal is compressed, maintaining the users adjustment. The rubber seal is important because it allows for the compression to be transferred to the upper shaft and hold the same in a desired position without defacing or distorting the shaft.

The boom arm can be adjusted 180 degrees vertically, and 90 degrees horizontally along with other points therebetween, without stressing the wiring to the boom arm. The boom arm can be extended on the user side, up to 25 centimeters (up to about 9 inches) to accommodate the depth from the stand for the user of the microphone stand.

With FIG. 1, microphone stand 170 has a weighted base 140 which replaces the tripod 102 of FIG. 2. A locking coupler 121 is positioned on support base 120 oppositely disposed from tripod base 102 and adjacent to upper shaft assembly 116.

Adding now to FIG. 2 to the consideration, microphone stand 170 has a tripod base 102. The support base 118 is secured to the tripod base 102. The upper shaft assembly 116 is in a male to female relationship with the support base 118. Around support base 118 is a flexible lighting strip 107. The flexible lighting strip 107 can be any suitable strip, but preferred is a red and green and blue light emitting diodes (RGB LED) strips. The upper shaft assembly 116 has a locking coupler 121 which positions the upper shaft assembly 116 relative to support base 120. The locking coupler 121 is used to loosen and tighten the upper shaft assembly 116 to the support base 120, so that height adjustment can be maintained.

FIG. 2 also utilizes a microphone clip 101, oppositely disposed from the support base 100. Microphone clip 101 can receive a suitable microphone 112 (FIG. 10) as desired.

As shown in FIG. 2, boom arm assembly 150 can be inserted between support base 100 and the microphone clip 101, in order to allow for further adjustments by the user. The microphone clip 101 is then attached to boom arm assembly 150. Thus, the microphone stand 170 can have more flexibility with the boom arm assembly 150.

Figure 3:
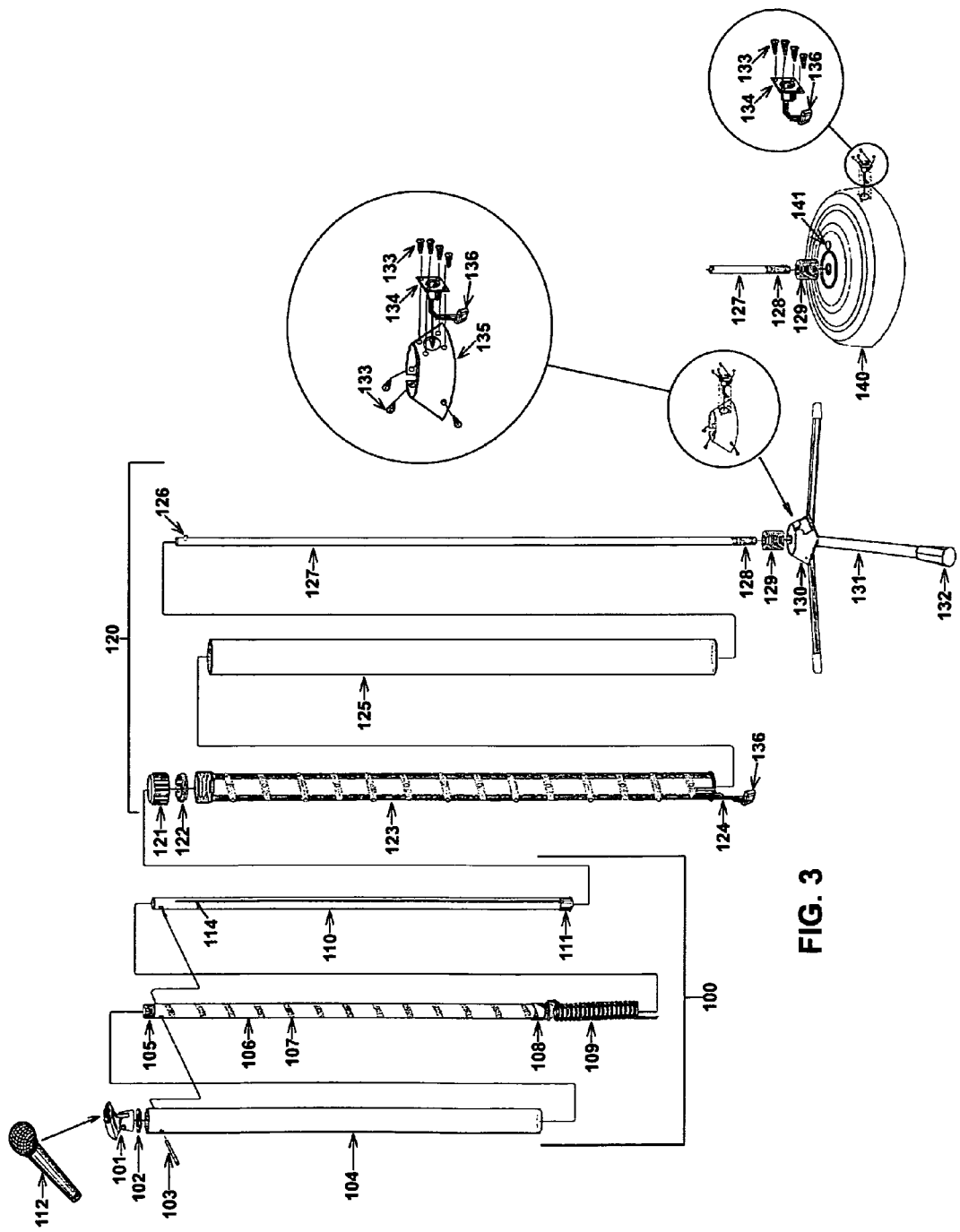
FIG. 3 depicts an exploded, perspective view of the microphone stand 170 having a support base 120 with the upper shaft assembly 116 and using either tripod base 102 or weighted base 140.

Turning now to FIG. 3, the structure of the microphone stand 170 becomes clear. The upper shaft assembly 116 is positioned relative to the support base 120 for the upper shaft assembly 116. Next to the microphone clip 101 is a locking device 102 on a spring pin 103 to cooperate with threaded member 105 on tubing 106. Inside tubing 106 is wrapped with flexible lighting strips 107 and covered with clear tubing 104 for protection of the lighting strips 107. Bushing 108, on tubing 106 and oppositely disposed from microphone clip 101, secures lighting strips 107 to coil 109, to facilitate use of lighting strips on upper shaft assembly 116.

The locking device 102 may be a suitably sized locking nut to adjust the position of the upper shaft assembly 116. The spring pin 103 assists with the upper shaft assembly 116. Upper clear tubing 104 is preferably a polycarbonate tube to protect lighting strips 107 on inside tubing 106. Inside tubing 106 is preferable a black steel tubing, around which lighting strips 107 are wrapped. Coil 109 is preferably a spring style cable or large gauge wiring to facilitate use of the lighting strip 107.

Within inside tubing 106 is inserted a support tube 110. Support tube 110 has a stop bushing 111 at the base thereof to assist with the positioning of the upper shaft assembly 116. A roll pin 113 is at the other end of support tube 110, oppositely disposed from the stop bushing 111. The roll pin 113 is preferably a spring style roll pin 113 to prevent movement of the upper shaft assembly 116 once installed. Thus, the purpose of this component is to prevent the upper shaft assembly 116 from turning independently from the support base 120, thereby protecting the internal wiring of lighting strips 108. Guide pin 126 slides vertically in this channel or keyway 114 so that the microphone stand 170 can be adjusted for height.

Between the support base 120 and the upper shaft assembly 116 is a locking coupler 121. Locking coupler 121 loosens and tightens the support base 120 to the upper shaft assembly 116, so that height adjustment can be maintained. Locking coupler 121 cooperates with compression seal 122, so that as locking coupler 121 is loosened, less pressure is applied to this compression seal 122, so that the height of stand 170 can be adjusted or maintained.

Support base 120 includes lower stand body 123 to house the internal components of the microphone stand 170. Support base 120 is wrapped in lighting strips 108. Lower stand body 123 has lighting strips 107 wrapped therearound with outer wiring harness 124. Outer wiring harness 124 connects to lighting strip 107 at coil 109, and then ultimately combines with four pin connector 134 at the base of the support base 120.

Lower clear tubing 125 fits over lower stand body 123. Preferably, lower clear tubing 125 is made of polycarbonate and protects the LED components in lighting strip 107. Guide pin 126 is used to guide the upper portion of the microphone 112 along a keyway 114 in the support tube 110 to prevent wiring failures, especially with regard to any uncontrolled movement between the upper shaft assembly 116 and the support base 120.

Support base 120 includes an upper shaft guide 127. Preferably upper shaft guide 127 is a solid galvanized rod. Upper shaft threading 128 is at the base of upper shaft guide 127, and permits attachment thereof to tripod base 102 or weighted base 140 with the use of adapter 129, to assemble the lower stand body 123 to the upper shaft guide 127. The upper shaft guide 127 passes in threaded relation through this adapter 128 and terminates at the tripod base 102 or weighted base 140 as desired.

Tripod base 102 may be fixed, or may include pivoting tripod legs 131 that pivot to fold for storage. For aesthetics or surface protection, each tripod leg 131 may have a protective foot 132 on the end thereof. Protective foot 132 may be rubber, plastic or other appropriate material.

With tripod base 102, mounting foot 135 participates in joining the same support base 120. Mounting foot 135 supports fastener 133 in four pin connector 134. The four pin connector 134 includes a four pin XLR female connector and wire harness, terminates at a DIN style four pin connector 136 to attach to like a connector coming from upper shaft assembly 116 and support base 120.

With weighted base 140, mounting foot 135 participates in the same fashion as tripod base 102. Weighted base 140 includes an access aperture 141 for wiring harness from support base 120 to enter weighted base 140.

Figure 4:
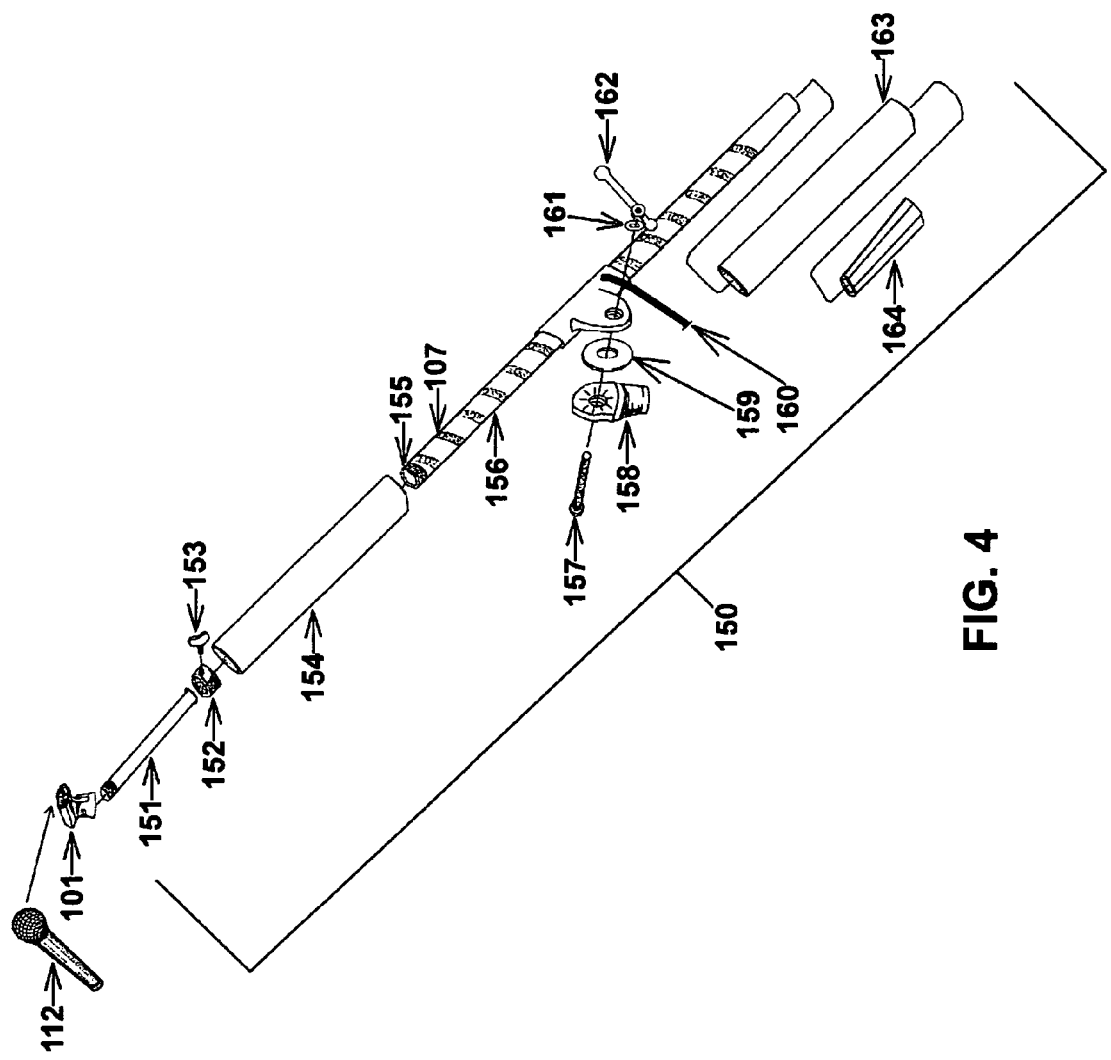
FIG. 4 depicts an exploded, perspective view of boom microphone arm 150 for microphone stand 170.
Figure 5:
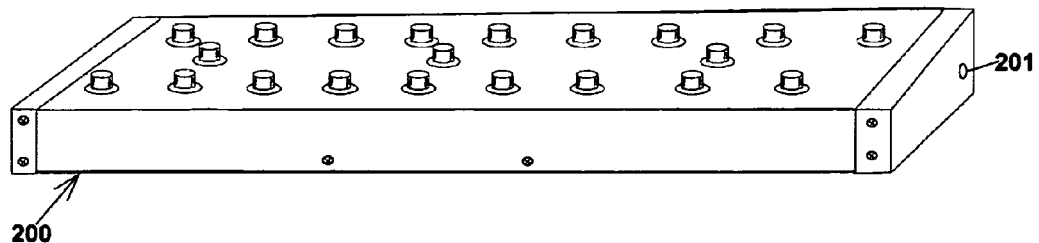
FIG. 5 depicts a front perspective view of the foot controlled board 200.
Figure 6:
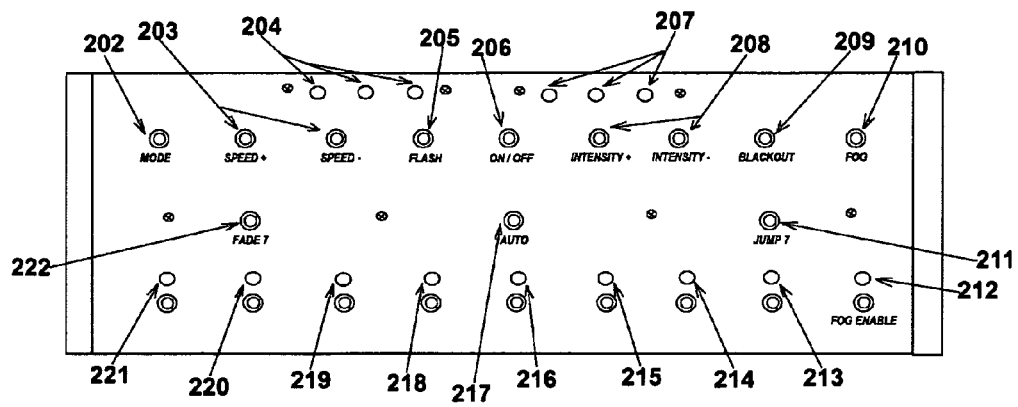
FIG. 6 depicts a top, plan view of the foot controlled board 200 for microphone stand 170.
Figure 7:
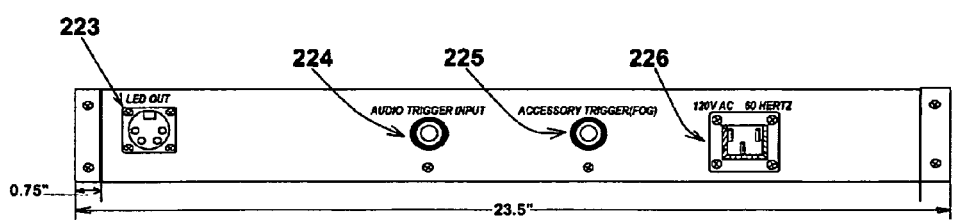
FIG. 7 depicts the rear plan view of the foot controlled board 200 for microphone stand 170.
Figure 8:
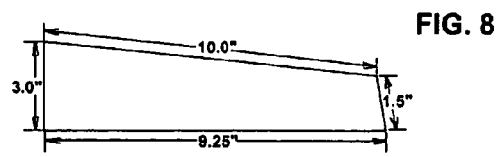
FIG. 8 depicts an end plan view of the foot controlled board 200 for microphone stand 170.
Figure 9:
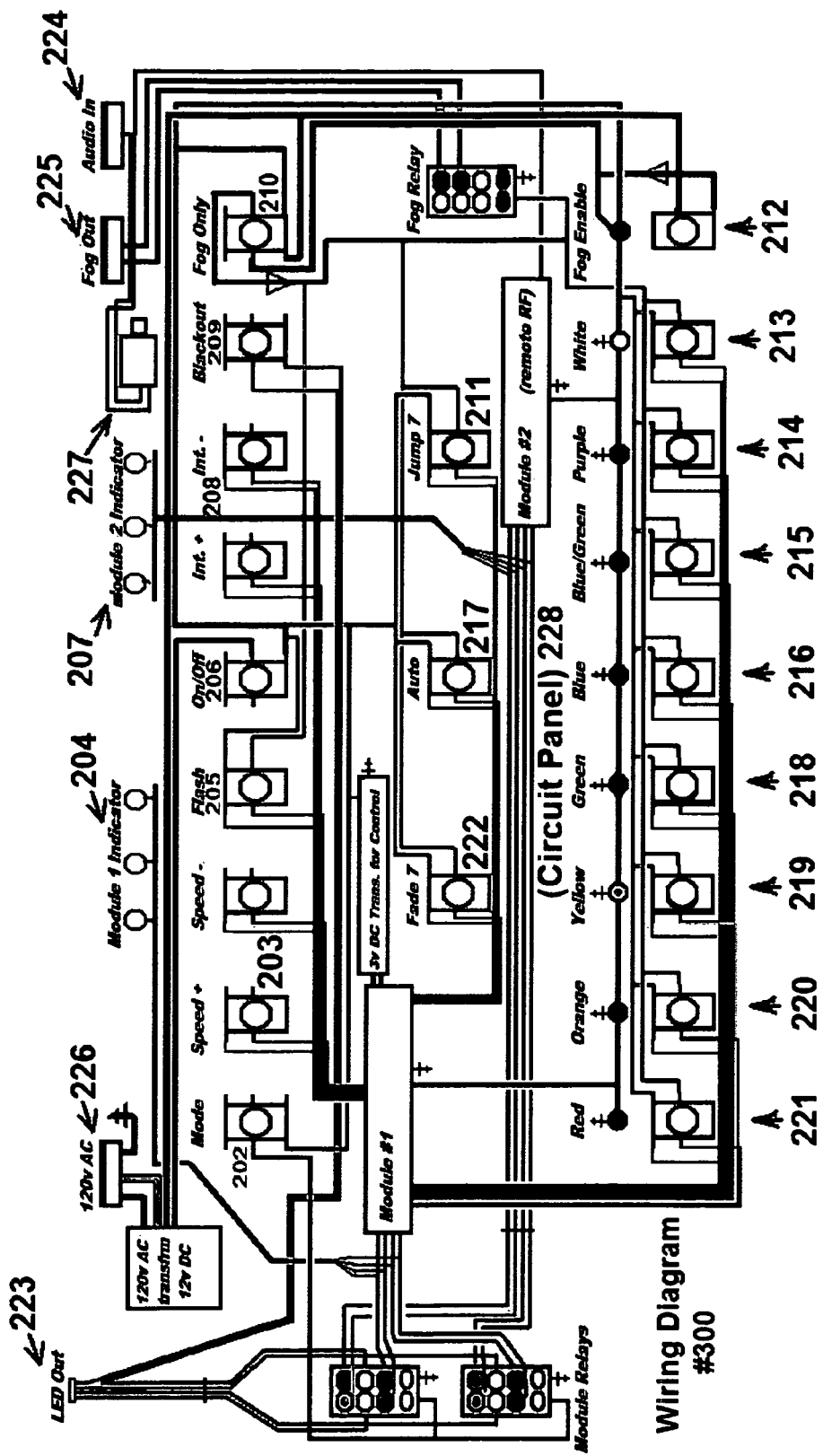
FIG. 9 depicts a wiring diagram for foot controlled board 200.

Adding FIG. 4 to the consideration, microphone clip 101 may be secured to boom arm assembly 150 to allow for further adjustments by the user. At one end of the boom arm assembly 150 is extension tube 151 to receive microphone clip 101 in threaded relation therewith. A collar 152 fits on extension tube 151 to join the same to the boom arm assembly 150. Thumbscrew 153 is in threaded relation with collar 152 to tighten or position the same on the extension tub 151.

Boom arm clear tube 154 fits over lighting strip 107, which is wrapped around boom arm base tube 156. Boom arm threads 155 on the end of boom arm base tube 156 receive collar 152 in a male to female relationship. A boom arm adapter 158 cooperates with carriage bolt 157 and washer 159 to attach boom arm assembly 150 to microphone stand 100. Carriage bolt 157 permits either a fastening or an adjusting of the angle of the boom arm assembly 150. Washer 159 can be rubber or any other suitable material, which can prevent slippage of boom arm assembly 150.

Also in the boom arm assembly 150 is a wire harness 160. Wire harness 160 lead from the boom arm assembly 150 and connect with the microphone stand 100. A washer 161 cooperates with adjustment lever 162 to fasten or adjust the position of boom arm assembly 150. Adjustment lever 162 can also incorporate at least one locking nut to fasten to the carriage bolt 157. Lower boom clear tube 163 covers lighting strip 107. Lower boom clear tube 163 is preferably polycarbonate. A weighted sleeve 164 inserted in lower boom clear tube 163 can balance the boom stand assembly 150 when a microphone 112 is placed on the microphone clip 101 on the microphone stand 170. Mounting sleeve 165 allows the boom arm assembly 150 to be attached microphone stand 170.

Now adding FIG. 5, FIG. 6, FIG. 7, FIG. 8, and FIG. 9 to the consideration, the function of foot controlled board 200 is clarified. An access aperture 201 permits sensitivity adjustment due to a potentiometer 227. An audio triggered input is activated to adjust the sensitivity. The potentiometer 227 is located on the circuit panel circuit panel 228 used to control adjustment.

A mode switch 202 switches the foot controlled board 200 between two forms of operation. One form allows the user to use the foot control board to operate the functions of the lights, while the other mode allows for an audio trigger input as well as remote control functions. Speed control switches 203 allow for the speed in certain lighting scenes to change. Module one indicator 204 permits the user to see in what mode the scene is transitioning. Color module 205 allows for the lights to flash in various sequences of color, speed and intensity, which can be controlled. A standard power switch 206 turns the foot controlled board 200 on or off as desired.

Module two indicator 207 permits the user to see what scene is transitioning in that mode. Intensity adjustment 208 permits brightness to be adjusted by module one indicator 204 and module two indicator 207 208. Intensity or brightness can be adjusted with these two switches. Blackout function 209 allows for the foot controlled board 200 and its functions to stay on, while the lighting for the microphone stand 170 is temporarily shut off.

Accessories 210 can also be controlled from the foot controlled board 200. Such accessories 210 include fog machines, lights flashing machines or other accessories of a similar nature to be controlled by the user. Switch controls 211 permit pre-programmed functions such as various color changes without transitions. For example, the colors jump from one to the next.

A fog enabler 212 allows the user to preset the control of any accessory 210 as a fog machine to be used simultaneously with the lighting show. Once the fog enabler 212 is activated, the user can press any of the scene change switches, and the fog machine is activated as well at the same time. Each color preferably has its own switch. Typically, white lighting switch 213, purple lighting switch 214, blue—green lighting switch 215, blue lighting switch 216, pre-programmed switch controls 217 (which functions with as automatic color changes with various transitions), green lighting switch 218, yellow lighting switch 219, orange lighting switch 220 and red lighting switch 221. Preprogrammed switch control 222 provide such functions as desired. For example, fading color changes, where the colors fade from one color to the next color can be accomplished with preprogram switch control 222.

A four pin output jack 223 can permit the foot controlled board 200 to be attached to the lighted microphone stand 170. Preferably, output jack 223 is a four pin XLR output jack which receives an 84 pin XLR cable to attach to the lighted microphone stand 170.

Also, an input jack 224 can allow any audio device to trigger audio input control of the foot controlled board 200. Accessory output 225 permits the foot controlled board 200 to operate accessories 210 such as fog machines, to enhance the lighting effect. Optionally, a standard electrical cord 226 may be used to provide power the foot controlled board 200. The cord 226 may be a standard three terminal input for 120 volt alternating current electric cord. Cord 226 can removable for ease of storage.

Figure 10:
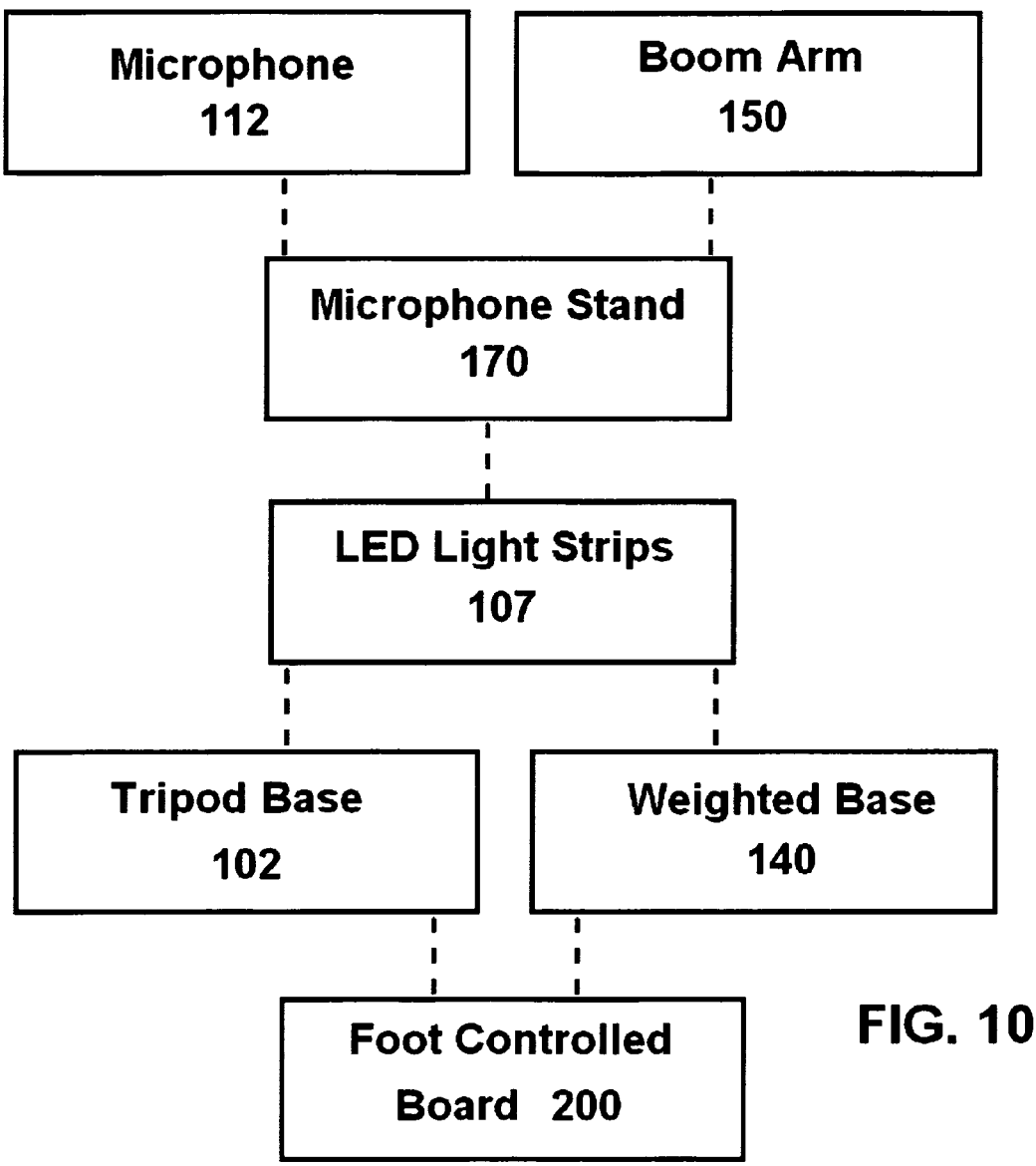
FIG. 10 depicts a block diagram of the microphone stand 170 with the foot controlled board 200.

Turning now to FIG. 10, microphone stand 170 includes lighting strips 107 mounted thereon. Foot controlled board 200 operates the microphone stand 170 and specifically the lighting strips 107 as desired, by a connection through either tripod base 102 or weighted base 140. Microphone 112 may be attached directly to microphone stand 170 to boom arm assembly 150. Boom arm assembly 150 can be positioned between microphone stand base 170 and microphone 112.

This application—taken as a whole with the abstract, specification, claims, and drawings being combined—provides sufficient information for a person having ordinary skill in the art to practice the invention as disclosed and claimed herein. Any measures necessary to practice this invention are well within the skill of a person having ordinary skill in this art after that person has made a careful study of this disclosure.

Because of this disclosure and solely because of this disclosure, modification of this method and device can become clear to a person having ordinary skill in this particular art. Such modifications are clearly covered by this disclosure.

What is claimed and sought to be protected by Letters Patent of the United States is:

1. In combination, an illuminated microphone stand with a foot controlled board comprising:

the illuminated microphone stand having a capability of adjusting at least one light in the illuminated microphone stand in order to facilitate a performance or maintain an integrity of a lighting system Incorporated with the illuminated microphone stand;

the illuminated microphone stand being adjustable while maintaining an working integrity for the lighting system;

the foot controlled board including an adjustment for sensitivity;

the foot controlled board including a sequence function to activate the foot controlled board in a desired order;

the adjustment for sensitivity being situated on a circuit panel for the foot controlled board;

the microphone stand including an upper shaft and a lower stand body;

the light system including a flexible lighting strip;

the flexible lighting strip being wrapped around the upper shaft or the lower shaft;

the flexible lighting strip including a coiled wire wrapped around the upper shaft;

the coiled wire being used to supply the upper shaft with the flexible lighting strip as the upper shaft is moved relative to the lower shaft;

the lower shaft being covered with a lower clear tubing over the flexible lighting strip; and the upper shaft being covered with a lower clear tubing over the flexible lighting strip and the coiled wire.

2. The combination of claim 1 further comprising:
a) the coiled wire extending as the upper shaft is raised;
b) the coiled wire relaxing as the upper shaft is lowered into a normal position;
c) the upper shaft being holdable in an adjusted place;
d) the upper shaft being adaptable to hold a boom arm or a microphone; and
e) the boom arm or the microphone being oppositely disposed from the lower shaft.

3. The combination of claim 2 further comprising:
a) the adjusted place being accomplished with a compression seal and an adjuster;
b) the adjuster being capable of a loosen function in order to provide less compression on the compression seal and to allow the upper shaft to move freely;
c) the adjuster being capable of a tighten function in order to provide more compression on the compression seal and to allow the upper shaft to become fixed in a desired position;
d) the boom arm being adjustable up to about 180 degrees vertically along with at least one other point therebetween, without stressing a wiring to the boom arm;
e) the boom arm being adjustable up to about 90 degrees horizontally along with at least one other point therebetween, without stressing the wiring to the boom arm; and
f) the boom arm being extendible up to about 25 centimeters for a user of the microphone stand.

4. The combination of claim 3 further comprising:
a) the microphone stand having a weighted base;
b) the support base being secured to the weighted base;
c) the upper shaft assembly being in a male to female relationship with the support base;
d) the upper shaft assembly being oppositely disposed from the weighted base; and
e) the support base having a flexible lighting strip wrapped therearound.

5. The combination of claim 3 further comprising:
a) the microphone stand having a tripod base;
b) the support base being secured to the tripod base;
c) the upper shaft assembly being in a male to female relationship with the support base;
d) the upper shaft assembly being oppositely disposed from the tripod base; and
e) the support base having a flexible lighting strip wrapped therearound.

6. The combination of claim 3 further comprising:
a) a locking coupler being positioned on support base adjacent to upper shaft assembly;
b) the locking coupler positioning the upper shaft assembly relative to the support base for a height adjustment; and
c) a boom arm assembly being positioned on the upper shaft assembly, in order to allow for at least one further adjustment.

7. The combination of claim 6 further comprising:
a) the upper shaft assembly further having a locking device on a spring pin oppositely disposed from the support base;
b) the upper shaft assembly further including an inside tubing;
c) the locking device being mounted on the inside tubing to cooperate with a threaded member on the inside tubing;
d) the inside tubing being wrapped with at least one flexible lighting strip;
e) the inside tubing and the at least one flexible lighting strip being covered with, an upper clear tubing for protection of the at least one flexible lighting strip; and
f) a bushing on the inside tubing securing the at least one flexible lighting strip to a coil in order to facilitate use of the at least one flexible lighting strip on the upper shaft assembly.

8. The combination of claim 7 further comprising:
a) the upper shaft assembly further having a locking device on a spring;
b) the upper clear tubing protecting the lighting strip on the inside tubing;
c) the inside tubing being a steel tubing;
d) the coil being a spring style cable to facilitate use of the light strip;
e) the inside tubing having a support tube inserted therein;
f) the support tube having a stop bushing at base thereof to assist with the positioning of the upper shaft assembly; and g) a roll pin being mounted at an end of the support tube, oppositely disposed from the stop bushing to prevent movement of the upper shaft assembly in order to prevent the upper shaft assembly from turning independently of the support base to protect the lighting strips.

9. The combination of claim 8 further comprising:
a) a guide pin sliding vertically in a key way on the inside tubing so that the microphone stand can be adjusted for height;
b) a locking coupler being positioned between the support base and the upper shaft assembly;
c) the locking coupler supporting the height adjustment;
d) the locking coupler cooperating with the compression seal to provide the height adjustment;
e) the support base including the lower stand body to house at least one component of the microphone stand;
f) the support base being wrapped in a lower lighting strip;
g) an outer wiring harness connecting to the coil, and ultimately combining with a four pin connector;
h) a lower clear tubing fitting over the lower stand body to protect the light strip; and
i) the guide pin preventing an uncontrolled movement between the upper shaft assembly and the support base.

10. The combination of claim 9 further comprising:
a) the support base including an upper shaft guide;
b) the upper shaft guide having upper shaft threading at a base of the upper shaft guide;
c) the upper shaft threading permitting attachment thereof to a tripod base or a weighted base;
d) the boom arm assembly having an extension tube;
e) a microphone clip being secured to the extension tube;
f) the boom arm assembly including a boom arm base tube;
g) the boom arm base tube having a boom arm light strip wrapped therearound;
h) a boom arm clear tube fitting over the boom arm light strip;
i) boom arm threads being on an end of the boom arm base tube;
j) a boom arm adapter being received on the boom arm threads to cooperate with the microphone clip; and
k) a boom arm wire harness leading from the boom arm assembly and connecting with the microphone stand.

11. The combination of claim 10 further comprising:
a) the foot controlled board having an access aperture;
b) the access permitting a sensitivity adjustment due to a potentiometer;
c) an audio triggered input being activated for the sensitivity adjustment;
d) the foot controlled board including a mode switch;
e) the mode switch changing the foot controlled board between a first form of operation and a second form of operation;
f) the first form allowing a user to operate the function of lights with the foot control board;
f) the second form allowing a user to operate an audio trigger input and remote control functions;
g) the foot controlled board including at least one speed control switch to allow for a scene; and
h) the foot controlled board including a module indicator to indicate see in what mode a scene is transitioning.

12. The combination of claim 11 further comprising;
a) the foot controlled board including a color module to allow for the lights to flash in various sequences of color, speed and intensity;
b) the foot controlled board including a second module to control which scene is transitioning in which mode;
c) the foot controlled board including an intensity adjustment to permit brightness to be adjusted by the first module and the second module;
d) the foot controlled board including a blackout function to allow for the foot controlled board to stay on, while the lighting for the microphone stand is temporarily shut off;
e) the foot controlled board including at least one accessory control; and
f) the foot controlled board including a plurality of light controls.

13. The combination of claim 12 further comprising:
a) the at least one accessory including at least one accessory selected from the group consisting of a fog machine, a light flashing machine, a switch control for colors, a fog enabler, a color fade switch, a switch control for each color, and a lighting switch;
b) the foot controlled board including a four pin output jack to attach the foot controlled board to the lighted microphone stand; and
c) the foot controlled board including an input jack to allow any audio device to trigger audio input control of the foot controlled board.

14. An illuminated microphone stand comprising:
the illuminated microphone stand having a capability of adjusting at least one light in the illuminated microphone stand in order to facilitate a performance or maintain an integrity of a lighting system incorporated with the illuminated microphone stand;
the illuminated microphone stand being adjustable while maintaining the integrity of the lighting system; and
the microphone stand including an upper shaft and a lower stand body;
the light system including a flexible lighting strip;
the flexible lighting strip being wrapped around the upper shaft or the lower shaft;
the flexible lighting strip including a coiled wire wrapped around the upper shaft;
the coiled wire being used to supply the upper shaft with the flexible lighting strip as the upper shaft is moved relative to the lower shaft;
the lower shaft being covered with a lower clear tubing over the flexible lighting strip;
the upper shaft being covered with a lower clear tubing over the flexible lighting strip and the coiled wire;
the coiled wire extending as the upper shaft is raised;
the coiled wire relaxing as the upper shaft is lowered into a normal position;
the upper shaft being holdable in an adjusted place;
the upper shaft being adaptable to hold a boom arm or a microphone;
the boom arm or the microphone being oppositely disposed from the lower shaft;
the adjusted place being accomplished with a compression seal and an adjuster;
the adjuster being capable of a loosen function in order to provide less compression on the compression seal and to allow the upper shaft to move freely;
the adjuster being capable of a tighten function in order to provide more compression on the compression seal and to allow the upper shaft to become fixed in a desired position;
the boom arm being adjustable up to about 180 degrees vertically along with at least one other point therebetween, without stressing the wiring to the boom arm;

the boom arm being adjustable up to about 90 degrees horizontally along with at least one other point therebetween, without stressing the wiring to the boom arm;
the boom arm being extendible up to about 25 centimeters to a user of the microphone stand;
the microphone stand having a weighted base;
the support base being secured to the weighted base; and
the upper shaft assembly being in a male to female relationship with the support base.

15. The illuminated microphone stand of claim 14 further comprising:
   a) the microphone stand having a tripod base or a weighted base;
   b) the support base being secured to the tripod base or the weighted base;
   c) the upper shaft assembly being in a male to female relationship with the support base;
   d) the upper shaft assembly being oppositely disposed from the tripod base or the weighted base;
   e) the support base having a flexible lighting strip wrapped therearound;
   f) a locking coupler being positioned on support base adjacent to upper shaft assembly;
   g) the locking coupler positioning the upper shaft assembly relative to the support base for a height adjustment;
   h) a boom arm assembly being positioned on the upper shaft assembly, in order to allow for at least one further adjustments;
   i) the upper shaft assembly further having a locking device on a spring pin oppositely disposed from the support base;
   j) the upper shaft assembly further including an inside tubing;
   k) the locking device being mounted on the inside tubing to cooperate with a threaded member on the inside tubing;
   l) the inside tubing being wrapped with at least one flexible-lighting strip;
   m) the inside tubing and the at least one flexible lighting strip being covered with an upper clear tubing for protection of the at least one flexible lighting strip;
   n) the at least one light being at least on light emitting diode; and
   o) a bushing on the inside tubing securing the at least one flexible lighting strip to a coil in order to facilitate use of the at least one flexible lighting strip on the upper shaft assembly.

16. The illuminated microphone stand of claim 15 further comprising:
   a) the upper shaft assembly further having a locking device on a spring
   b) the upper clear tubing protecting the lighting strip on the inside tubing;
   c) the inside tubing being a steel tubing;
   d) the coil being a spring style cable to facilitate use of the light strip;
   e) the inside tubing having a support tube inserted therein,
   f) the support tube having a stop bushing at base thereof to assist with the positioning of the upper shaft assembly;
   g) a roll pin being mounted at an end of the support tube, oppositely disposed from the stop bushing to prevent movement of the upper shaft assembly in order to prevent the upper shaft assembly from turning independently of the support base to protect the lighting strips;
   h) the upper shaft assembly being oppositely disposed from the weighted base; and
   i) the support base having a flexible lighting strip wrapped therearound.

17. The illuminated microphone stand of claim 16 further comprising:
   a) a guide pin sliding vertically in a key way on the inside tubing so that the microphone stand can be adjusted for height;
   b) a locking coupler being positioned between the support base and the upper shaft assembly;
   c) the locking coupler supporting the height adjustment;
   d) the locking coupler cooperating with the compression seal to provide the height adjustment;
   e) the support base including the lower stand body to house at least one component of the microphone stand;
   f) the support base being wrapped in a lower lighting strip;
   g) an outer wiring harness connecting to the coil, and ultimately combining with a four pin connector;
   h) a lower clear tubing fitting over the lower stand body to protect the light strip;
   i) the guide pin preventing an uncontrolled movement between the upper shaft assembly and the support base;
   j) the support base including an upper shaft guide;
   k) the upper shaft guide having upper shaft threading at a base of the upper shaft guide;
   l) the upper shaft threading permitting attachment thereof to a tripod base or a weighted base;
   m) the boom arm assembly having an extension tube;
   n) a microphone clip being secured to the extension tube;
   o) the boom arm assembly including a boom arm base tube;
   p) the boom arm base tube having a boom arm light strip wrapped therearound;
   q) a boom arm clear tube fitting over the boom arm light strip;
   r) boom arm threads being on an end of the boom arm base tube;
   s) a boom arm adapter being received on the boom arm threads to cooperate with the microphone clip; and
   t) a boom arm wire harness leading from the boom arm assembly and connecting with the microphone stand.

* * * * *